Feb. 28, 1956     E. B. BOYLE, JR     2,736,878

DIVE-BOMBING BREAKAWAY COMPUTER

Filed Jan. 26, 1954

INVENTOR
*EDWARD B. BOYLE, JR.*

BY
ATTORNEYS

United States Patent Office 2,736,878
Patented Feb. 28, 1956

2,736,878

DIVE-BOMBING BREAKAWAY COMPUTER

Edward B. Boyle, Jr., Severna Park, Md., assignor, by mesne assignments, to the United States of America as represented by the Secretary of the Navy Application January 26, 1954, Serial No. 406,376

12 Claims. (Cl. 340—27)

This invention relates to a safety device which will inform the pilot of an airplane performing a dive bombing or toss bombing attack of the minimum safe altitude at which to pull out of his dive.

At the present time the pilot's judgment is solely relied upon for the determination of the proper time to pull out of a dive bombing or toss bombing attack. At high speeds and steep dive angles there is a tendency on the part of the pilot to underestimate the proper altitude at which to perform the pullout. In other cases a psychological factor, which is known as "target fascination," will cause a pilot to aim his craft at a target until he crashes into it. The reliance on a pilot's judgment therefore often results in crashes which in turn result in a needless waste of manpower and equipment. Furthermore, in certain cases when air to ground dive bombing attacks are made without direct visual contact with the ground, a pilot has to rely on a multiplicity of independent instruments to determine when he should pull out of a dive bombing attack. This procedure often leads to confusion on the part of the pilot which also results in crashes which could have been avoided.

The present invention discloses a safety device which emits a signal at the proper time for warning the pilot to pull out of his dive. Broadly, this invention discloses a computer which utilizes the true airspeed, dive angle, and altitude of the aircraft to compute the minimum safe altitude for executing a pullout. The foregoing information may be obtained directly from the respective instruments which produce this data or may be obtained from the dive bombing or toss bombing computer. The computer of the present invention evaluates the foregoing data, and when the minimum safe altitude for a pullout is reached, produces a signal which warns the pilot that it is time to pull out of his dive.

It is accordingly the object of this invention to disclose a safety device which warns the pilot of an aircraft engaged in a dive or toss bombing attack when to pull out of his dive both when he has visual contact with the ground and when he does not have direct visual contact with the ground.

Other objects and many of the attendant advantages of this invention will be readily appreciated as the same becomes better understood by reference to the following detailed description when considered in connection with the accompanying drawings wherein.

Figure 1:
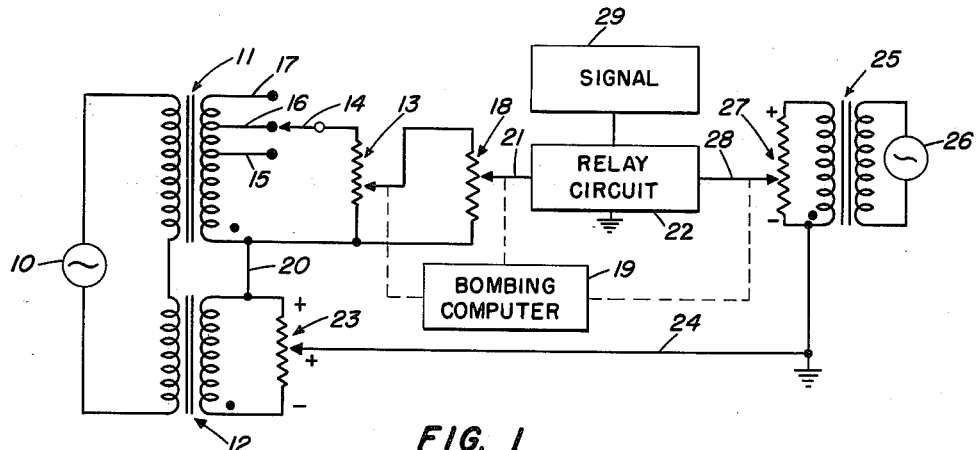
Fig. 1 is a schematic diagram of the breakaway computer of the instant invention.

In Fig. 1 numeral 10 denotes a source of alternating voltage. Connected in series across source 10 are the primaries of transformers 11 and 12. Potentiometer 13 is connected across the secondary of transformer 11 via switch 14 which taps off successively higher voltages from the secondary of transformer 11 depending on whether it is in contact with taps 15, 16, or 17, respectively. Connected across potentiometer 13 is potentiometer 18. The movable tap of potentiometer 13 is mechanically connected to the aircraft bombing computer 19, and moves an amount which is proportional to the airspeed of the aircraft. Thus it can be seen that the higher the airspeed of the aircraft, the higher will be the voltage output of potentiometer 13. The movable tap of potentiometer 18 is mechanically connected to another output from the aircraft bombing computer 19 and moves an amount which is proportional to the climb angle of the aircraft. The steeper the dive, the higher will be the voltage output from potentiometer 18. Inherent in the voltage output across the secondary of transformer 11 is a voltage which has incorporated therein a voltage which is proportional to the amount of altitude which will be lost during the reaction time of the pilot. Connected across the secondary of transformer 12 is manually adjustable potentiometer 23. The resistance portion of potentiometer 23 is connected in series with the resistance portion of potentiometer 18 via line 20. Potentiometer 23 is manually adjusted to provide a voltage output which is proportional to the amount of clearance altitude which is required between the ground and the aircraft after the aircraft completes its dive and starts its upward climb. Also inherent in the output voltage of the secondary of transformer 12 is a voltage which is proportional to the instrumental inaccuracies inherent in the airspeed and climb angle data. Thus it can be seen that the left hand side of the circuit shown in Fig. 1 produces a voltage which is proportional to the amount of altitude required to pull out of a dive and which incorporates the factors of airspeed and climb angle of the aircraft, reaction time of the pilot, the required amount of clearance between the aircraft and the ground at pull out of the dive, and instrumental errors inherent in obtaining the foregoing data. This voltage is fed through line 21 to the left hand side of relay circuit 22.

Transformer 25 is connected across a source of alternating voltage 26. Potentiometer 27 is connected across the secondary of transformer 25. The movable tap of potentiometer 27 is mechanically connected to the bombing computer 19 for the purpose of positioning said tap relative to the potentiometer 27 so that its position produces a voltage which is at all times proportional to the absolute altitude of the aircraft above the ground. This output voltage is fed to the right hand side of relay circuit 22 by means of line 28.

It is to be noted at this point that the altitude, dive angle, and airspeed inputs to the relay circuit do not necessarily have to be obtained from the bombing computer, but may be obtained directly from the airspeed indicator, dive or climb angle indicator, and from an absolute altimeter.

The relay circuit 22 serves the function of comparing the voltage which is proportional to the amount of altitude required to pull out of a dive with the voltage which is proportional to the actual absolute altitude of the aircraft. When these two altitudes are equal, signal 29 is energized which warns the pilot that it is time for him to pull out of his dive.

Reference is now made to switch 14, Fig. 1, which selectively coacts with taps 15, 16, and 17 which lead from the secondary of transformer 11. Switch 14 is manually engageable with either of the aforementioned taps and provides an added refinement of the warning system. If the pilot desires to pul out of his dive rapidly, that is, perform a 5–G pullout, switch 14 will be manually engaged with tap 15. In this way a relatively small voltage will be transmitted to the relay circuit 22. If the pilot desires to pull out of his dive more slowly than above, that is, perform a 3–G pullout, switch 14 will be manually engaged with tap 17. In this way a relatively large voltage will be transmitted to relay circuit 22. It can thus be seen that since the voltage transmitted to relay circuit 22 through line 21 is directly proportional to the amount of altitude required to pull out of a dive, a higher voltage will be transmitted to relay circuit 22 via switch 14 when the pullout is relatively slow, and a lower voltage will be transmitted when the pullout is relatively fast. It will be noted at this point that any number of taps may be attached to the secondary of transformer 11 for accomplishing the above mentioned purpose.

Figure 2:
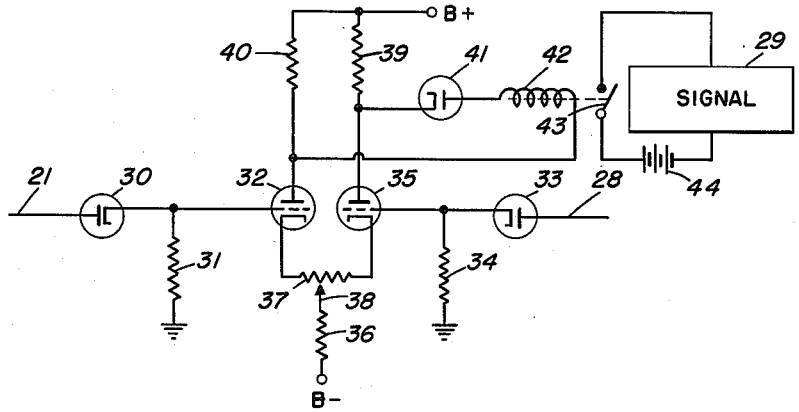
Fig. 2 is a wiring diagram of the relay circuit shown in Fig. 1.

Reference is now made to Fig. 2 for a description of the relay circuit depicted by numeral 22 in Fig. 1. Line 21 carries a voltage which is proportional to the altitude required to pull out of a dive. This voltage is applied to the plate of rectifier tube 30. Tube 30 rectifies the alternating voltage transmitted by line 21. The cathode of rectifier tube 30 is connected to ground via biasing resistance 31, and to the grid of amplifier tube 32. Line 28 transmits a voltage which is proportional to the absolute altitude of the aircraft above the ground. This voltage is impressed on the plate of rectifier tube 33 which rectifies the alternating voltage input to tube 33. The cathode of rectifier 33 is connected to ground via resistance 34 and to the grid of amplifier triode 35. It will be noted that triodes 32 and 35 may be a duo-triode but have been shown as independent triodes for convenience. The cathode of triodes 32 and 35 are connected to B− via biasing resistor 36 and a portion of resistance 37. It will be noted that resistor 37 and movable tap 38 coact as a voltage division means for the purpose of initially balancing the cathode voltages of triodes 32 and 35, as might be required. The plate of triode 35 is connected to B+ via load resistor 39. The plate of triode 32 is connected to B+ via load resistor 40. Connected in series between the plates of triodes 32 and 35 are the diode 41 and solenoid 42, the cathode of diode 41 being connected to the junction between the plate of triode 35 and resistor 39. Diode 41 will conduct only when the input to the grid of triode 35 becomes equal to the input to the grid of triode 32. Before this condition is reached the voltage on the grid of triode 35, which represents the absolute altitude of the aircraft, is greater than the altitude required to pull out of the dive and therefore conduction of diode 41 is prevented. However, when the condition is reached where the actual absolute altitude of the aircraft is equal to the altitude required for safe pullout, as depicted by the equality of the voltages on the grids of triodes 32 and 35, then diode 41 will conduct thereby actuating solenoid 42.

Solenoid 42, when actuated, closes switch 43, which in turn completes the circuit between battery 44 and signal 29. This signal may be of any suitable type, for example, it may consist of a light which is mounted on the aircraft instrument panel, or it may consist of a warning buzzer which is tied in to the pilot's earphones.

It can thus be seen that the instant invention discloses a small, relatively simple safety device which warns the pilot of a dive bombing aircraft of the proper time to pull out of his dive.

Obviously many modifications and variations of the present invention are possible in the light of the above teachings. It is therefore to be understood that within the scope of the appended claims the invention may be practiced otherwise than as specifically described.

Having thus described my invention I claim:

1. A device which produces a signal when a dive bombing aircraft reaches a predetermined altitude comprising first means for producing a first voltage which is proportional to the airspeed, climb angle, instrumental errors inherent in obtaining said airspeed and climb angle, plus the altitude at which the aircraft is to start its upward climb after the dive has been completed, said first voltage being proportional to the altitude required to pull out of a dive plus a clearance altitude, second means for producing a second voltage which is proportional to the absolute altitude of the aircraft, and means for producing a warning signal when said first and second voltages bear a predetermined relationship to each other.

2. A device which produces a signal when a dive bombing aircraft reaches a predetermined altitude comprising first means for producing a first voltage which is a function of the airspeed and climb angle of the aircraft, and a function of the altitude at which the aircraft is to start its upward climb after the dive has been completed, said first voltage being proportional to the altitude required to pull out of a dive plus a clearance altitude, second means for producing a second voltage which is proportional to the absolute altitude of the aircraft, and means responsive to said first and second voltages for producing a warning signal when said first and second voltages bear a predetermined relationship to each other.

3. A device which produces a warning signal when a dive bombing aircraft reaches a predetermined altitude comprising first means for producing a first voltage which is proportional to the amount of altitude required for an aircraft to pull out of a dive plus a clearance altitude above the ground at which the aircraft is to start its upward climb after completing the dive, second means for producing a second voltage which is at all times proportional to the absolute altitude of the aircraft and means responsive when said first and second voltages bear a predetermined relationship to each other to produce a warning signal.

4. A device which produces a warning signal when a dive bombing aircraft reaches a predetermined altitude comprising first means for producing a first response which is proportional to the amount of altitude required for an aircraft to pull out of a dive plus a clearance altitude at which the aircraft is to start its upward climb after it has completed its dive, second means for producing a second response which is proportional to the absolute altitude of the aircraft, and means responsive when said first and second responses bear a predetermined relationship to each other for producing a warning signal.

5. A device for producing a warning signal when a dive bombing aircraft reaches a predetermined altitude comprising first means for producing a first response which is proportional to the amount of altitude required for an aircraft to pull out of a dive and clear the ground, second means for producing a second response which is proportional to the absolute altitude of the aircraft, means responsive to said first and second responses to produce a warning signal when the altitudes represented by said first and second responses are equal.

6. A device for producing a warning signal when a dive bombing aircraft reaches a predetermined altitude, comprising first means for producing a first response which is proportional to the amount of altitude required to pull out of a dive plus the altitude at which the aircraft is to start its upward climb after it has completed its dive plus a factor which allows for instrumental errors inherent in obtaining the altitude at which it is required to pull out of a dive, second means for producing a second response which is proportional to the absolute altitude of the aircraft, and means responsive to said first and second responses to produce a warning signal when the altitudes represented by said first and second responses are equal.

7. A device for producing a warning signal when a dive bombing aircraft reaches a predetermined altitude comprising first means for producing a first response which is proportional to the amount of altitude required for an aircraft to pull out of a dive plus a clearance altitude by which the aircraft is to clear the ground after it has completed its dive, adjustable means operatively connected to said first means for modifying said first response in accordance with the desired rapidity of pullout from said dive, second means for producing a response which is at all times proportional to the absolute altitude of the aircraft, and means for producing a warning signal when the altitudes represented by said modified first response and said second response are equal.

8. A device for producing a warning signal when a dive bombing aircraft reaches a predetermined altitude comprising a voltage source, a first potentiometer connected across said source for producing a voltage which is proportional to the amount of altitude required for an aircraft to pull out of a dive, a second potentiometer connected across said source and in series with said first potentiometer for producing a voltage which is proportional to the amount of altitude required when the aircraft is to start its upward climb after the dive has been completed, a third potentiometer connected across said source for producing a voltage which is at all times proportional to the absolute altitude of the aircraft, a relay circuit for receiving said voltage outputs from said potentiometers, said relay circuit being energized when the altitude represented by the combined voltage of said first and second potentiometers is equal to the altitude represented by the voltage of said third potentiometer, and signal means connected to said relay circuit for producing a signal when said relay circuit is energized.

9. A device for producing a warning signal when a dive bombing aircraft reaches a predetermined altitude comprising a first voltage source, first potentiometer means connected across said voltage source for producing a voltage which is proportional to the amount of altitude required to pull out of a dive plus an altitude corresponding to the amount of clearance between the aircraft and the ground when the aircraft starts its upward climb after the dive has been completed, second potentiometer means connected across said voltage source for producing a voltage which is proportional to the absolute altitude of the aircraft, relay means for receiving the outputs from said potentiometers, said relay means being energized when the altitudes represented by the voltages of said first and second potentiometers are equal, and signal means connected to said relay means for producing a signal when said relay means is energized.

10. A device for producing a warning signal as set forth in claim 9 wherein said relay means comprises a plurality of amplifier tubes having cathodes, grids, and plates, each of said grids being connected to one of the outputs of said potentiometers, said cathodes and plates being connected across a second voltage source, and a solenoid connected in series across said plates for energizing said signal means.

11. A device for producing a warning signal as set forth in claim 10 wherein first switch means is placed in series with said solenoid whereby said solenoid can be actuated only when the altitudes represented by said potentiometer outputs are equal.

12. A device for producing a warning signal as set forth in claim 11 wherein second switch means are placed in series between said first voltage source and said first potentiometer means for selectively utilizing different voltages from said first voltage source as determined by the desired rate of pullout from a dive.

References Cited in the file of this patent

UNITED STATES PATENTS

| | | |
|---|---|---|
| 2,316,411 | Finnegan | Apr. 13, 1943 |
| 2,498,103 | Wojciechowski | Feb. 21, 1950 |
| 2,620,400 | Snijders | Dec. 2, 1952 |
| 2,624,510 | La Coste | Jan. 6, 1953 |
| 2,676,253 | Ayres | Apr. 20, 1954 |
| 2,709,797 | McEwan | May 31, 1955 |